April 9, 1963  E. FESSER  3,084,565
VARIABLE RATIO POWER TRANSMISSION APPARATUS
Filed Aug. 23, 1961
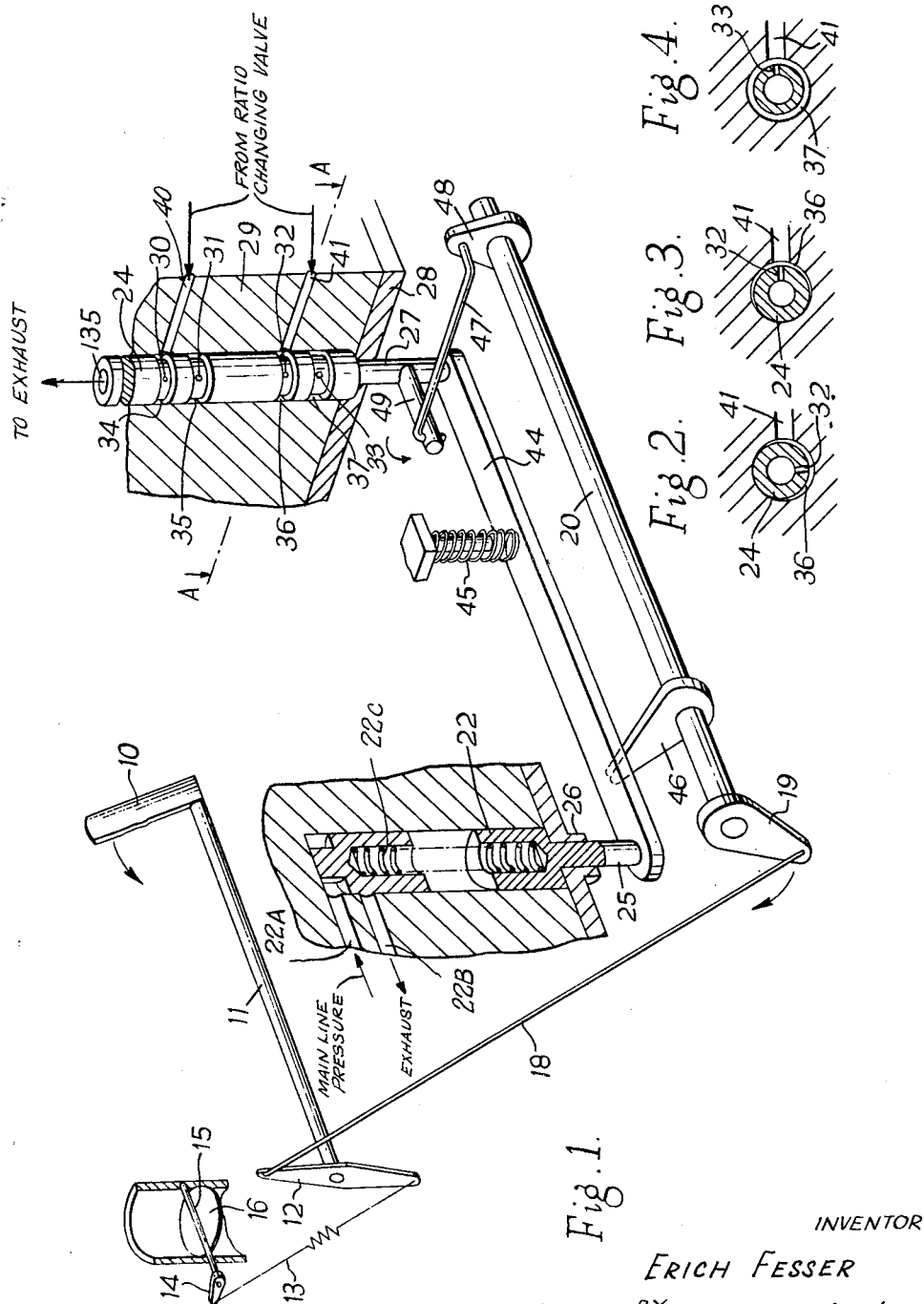
INVENTOR
ERICH FESSER
BY Irwin S. Thompson
ATTORNEY

United States Patent Office 3,084,565
Patented Apr. 9, 1963

3,084,565
VARIABLE RATIO POWER TRANSMISSION
APPARATUS
Erich Fesser, Koln Riehl, Germany, assignor to Hobbs
Transmission Limited, Leamington Spa, England
Filed Aug. 23, 1961, Ser. No. 133,444
Claims priority, application Great Britain Mar. 21, 1961
5 Claims. (Cl. 74—472)

This invention relates to hydraulic control apparatus for a variable ratio power transmission apparatus having hydraulically applied clutches and brakes for effecting changes of transmission ratio. An example of such apparatus is described in the specification of British Patent No. 738,590 comprising an epicyclic gearing driven by clutches and controlled by reaction brakes and an hydraulic apparatus for controlling the clutches and brakes is described in the specification of British Patent No. 738,588.

Specification 738,588 describes a control apparatus having a governor valve or ratio changing valve 12 to which fluid under pressure is supplied from a pump driven from the output shaft and controlled by an exhaust valve 20 which can be adjusted to vary the area of the exhaust openings and thus control the vehicle speeds at which ratio changes are effected, the valve 20 being connected to the accelerator pedal of a vehicle and thus serving as a kickdown change device, i.e. a device connected with the usual speed control member (e.g. accelerator pedal) for effecting a change of transmission ratio at higher than normal speeds for accelerating or hill climbing. An improved form of such device is described in the specification of British Patent No. 808,318.

The object of the present invention is to provide a further improvement in such change speed varying control devices.

A particular problem in such apparatus is to produce the required variations in a simple manner by movements of one controlling member and to provide greater or less variation over select parts of its total movement.

According to the present invention a hydraulic control apparatus for a variable ratio power transmission apparatus having hydraulically applied clutches and brakes for effecting changes of transmission ratio comprises a ratio changing valve supplied with fluid pressure which determines ratio changes, means connected with the engine speed control member for varying said pressure progressively as engine throttle is opened to cause ratio changes to be effected at high transmission apparatus output speeds with increasing throttle opening and means to cause a further variation of said pressure in the same sense when the engine speed control member is moved beyond its full throttle position.

A constructional form of the invention will be described by way of example with reference to the accompanying diagrammatic drawing wherein FIGURE 1 is a perspective view of a device made in accordance with the invention and FIGURES 2, 3 and 4 are sectional views on the line A—A on FIGURE 1 showing the parts in three different positions.

The device includes a motor-car accelerator pedal 10 connected by rod 11, lever 12, wire 13, and arm 14 to the spindle 15 of a normal butterfly throttle valve 16 of a motor-car engine.

The lever 12 is connected by a rod 18 and arm 19 to a spindle 20 which actuates two valves, viz. a relief valve 22 (which corresponds to valve 53 in FIGURE 3 of British Patent No. 738,588) and a kickdown exhaust valve piston 24 (which corresponds to valve 20 in FIGURE 3 of British Patent No. 738,588). The valve 22 has a pin 25 projecting through a boss 26 that serves as a stop. The piston 24 has a pin 27 projecting through the cover plate 28 of a valve box 29. The piston 24 operates in a bore in the box 29 and has an internal axial exhaust channel 135 connected by exhaust openings 30, 31, 32, 33 with annular grooves 34, 35, 36, 37 respectively, the openings 30, 32 being smaller than 31, 33. The box 29 has openings 40, 41. Axial movement of the piston 24 brings the grooves 34, 36 or 35, 37 into communication with the openings 40, 41 that connect via a selector valve (55 in FIGURE 3 of British Patent No. 738,588) with the governor valve (12 in FIGURE 3 of British Patent No. 738,588). The interior channel 135 is connected to exhaust.

For actuating the valves 22 and 24 the pins 25, 27 are seated on (or connected by ball joints to) opposite ends of a beam 44 acted on by a spring 45 between the ends of the beam. An arm 46 on spindle 20 urges the beam 44 towards the valves so that over the first part of the travel of the pedal 10 the valve 22 through pin 25 is moved and when the beam is arrested by contacting the stop 26, further movement of the pedal causes the beam to pivot on the end of the pin 25 to axially move the kickdown valve piston 24.

The said valve 22 regulates the pressure in a channel 22A (this corresponding to channel 54 of British Patent No. 738,588) and this pressure is controlled by the force of the spring 22C in the valve 22. When the pressure tends to exceed the force of spring 22C the valve opens the channel 22A to an exhaust channel 22B. The force from the spring 22C on the valve 22 is varied by the beam 44 through pin 25 so as to more or less compress the spring 22C whereby the pressure in channel 22A is increased or decreased. This pressure in 22A is fed to the clutches and brakes (via the valve 12 of British Patent No. 738,588).

The valve 22 thus serves the purpose of controlling the fluid pressure supplied to the clutches and brakes. As the throttle is opened the pin 25 is moved up so as to compress the spring of the valve 22 thereby increasing the fluid pressure as required in accordance with increasing torque demand upon the engine.

The spindle 20 carries another arm 48 that is connected by a rod 47 to a pin 49 that projects radially from the pin 27. By this means the piston 24 is rotated during the first part of the movement of the pedal.

The grooves 34, 36 are made eccentric, the openings 30, 32 being in the deepest part of the groove.

The openings or ducts 40, 41 correspond with ducts 67, 80 of FIGURE 3 of British Patent No. 738,588 and the openings 30, 31 and 32, 33 correspond to the openings 16, 42 and 17, 41 in said FIGURE 3. Therefore, axial displacement of the valve piston 24 brings the smaller openings 30, 32 or the larger openings 31, 33 into operation for exhausting fluid pressure from the ratio changing valve 12 in said FIGURE 3. This change of size of the exhaust openings affects the fluid pressure acting on the ratio changing valve so as to cause the various change of transmission ratios to occur at different speeds of the output part of the transmission, the output part driving a pump 37 which supplies fluid pressure to the channel 13 in FIGURE 3 of British Patent No. 738,588. However, the valve piston is rotated prior to and simultaneously with its axial movement whereby the distance of fluid travel between openings 30, 31, 32, 33 and ducts 40, 41 is varied so that a further control is effected over the rate of exhaust from 40, 41 so as further to control the speeds of the output part of the transmission at which ratio changes are made. The beam 44 does not cause axial movement of the valve piston until it contacts the stop 26.

When the pedal is in the throttle closed position the channels 40, 41 will be in line with the shallow portion of the grooves 34, 36 as shown in FIGURE 2 and therefore the exhaust openings 30, 32 will be less effective and cause the ratio changes to take place at a lower vehicle speed. As the valve piston 24 is rotated during normal throttle opening the channels 40, 41 will come more and more in line with the exhaust openings 30, 32 thereby causing the speeds of change to become greater. FIGURE 3 shows the positions at full throttle. The grooves 34, 36 are not necessarily eccentric but may be concentric and pass only part way round the valve. In the kickdown position the exhaust openings 31, 33 are in line with the channels 40, 41 as shown in FIGURE 4 so that ratio changes occur at still greater vehicle speeds.

The depth of the groove will of course play an important part.

For example the normal exhaust openings used may be .052" to .093" diameter and a suitable groove will be one of about .1" wide and having a maximum depth at the exhaust opening of about .050". If the groove is concentric it will be shallower. Angular movement of the valve 24 will be about 70° to 90°.

There may be any number of channels 40, 41 and a pair of grooves such as 34, 35 for each channel.

Over a given vehicle speed range, normal operation of the exhaust piston to kickdown position will effect a down change; if the valve is moved to this position at low vehicle speeds however, it will serve to delay up changes until maximum engine speed is reached; if the exhaust piston is moved from kickdown to full throttle position an up change of ratio will occur.

With the present invention, it is practicable to arrange for ratio changes to occur at very low vehicle speeds when the throttle is nearly closed which assists in obtaining smooth up and down changes. At such low vehicle speeds the centrifugally acting valve in the clutch (described in the specification of British Patent No. 628,499) will cause the clutch to be at least partially disengaged. Consequently on opening the throttle again, the engine speed can accelerate sufficiently before complete engagement of the clutch to ensure that ratio change can occur without a noticeable bump.

In a particular construction the ratio changes occurred at the following vehicle speeds:

| | M.p.h. |
|---|---|
| First to second | 6 |
| Second to third | 12 |
| Third to top | 18 |
| Top to third | 14 |
| Third to second | 8 |
| Second to first | 4 |

These speeds varied continuously until at half throttle they were:

| | M.p.h. |
|---|---|
| First to second | 10 |
| Second to third | 19 |
| Third to top | 30 |
| Top to third | 22 |
| Third to second | 12 |
| Second to first | 5 |

The speeds continued to vary until at full throttle (FIGURE 3) they were:

| | M.p.h. |
|---|---|
| First to second | 15 |
| Second to third | 28 |
| Third to top | 40 |
| Top to third | 30 |
| Third to second | 16 |
| Second to first | 6 |

At the kickdown position the corresponding speeds were:

| | M.p.h. |
|---|---|
| First to second | 22 |
| Second to third | 40 |
| Third to top | 63 |
| Top to third | 55 |
| Third to second | 30 |
| Second to first | 14 |

I claim:

1. In or for a variable ratio power transmission apparatus for use with an engine having an engine speed control member, said apparatus having hydraulically applied clutches and brakes and a ratio changing valve, means for supplying fluid pressure to said ratio changing valve for urging it in one direction for controlling engagement and disengagement of said clutches and brakes for effecting changes of transmission ratio, said fluid pressure varying according to the speed of an output part of the apparatus; the provision of an exhaust valve for controlling exhaust of said fluid pressure to vary speeds of said output part at which ratio changes occur, said exhaust valve comprising a valve body having a bore, a plurality of exhaust ducts connecting the ratio changing valve to the bore, a valve piston in said bore, said piston having an exhaust bore therein and two exhaust openings of different sizes for each of said exhaust ducts, all of said exhaust openings communicating with said exhaust bore, grooves in said piston extending at least partially around the piston and communicating respectively with said exhaust openings, said exhaust ducts in said valve body communicating with said grooves whereby the larger openings and the smaller openings can alternatively be brought into communication through the grooves with said ducts by axial displacement of said exhaust valve piston, and means connected with the engine speed control member for actuating said piston in two directions, i.e., axially and rotatably about its axis, rotatable movement of the piston varying the fluid path distance between the openings and the ducts.

2. A control apparatus as claimed in claim 1 including a relief valve for controlling the engaging pressure of fluid supplied to the brakes and clutches, and means for moving said relief valve to increase said engaging pressure over at least an initial part of the throttle opening movement of the speed control member while simultaneously rotating the exhaust valve piston.

3. A control apparatus as claimed in claim 2 including a shaft, rotated by connection with said speed control member, a beam connected with the relief valve and with the exhaust valve piston, means on the shaft to rock the beam to actuate first the relief valve and then the exhaust valve piston in the axial direction, and means connecting the shaft to the exhaust valve piston to rotate the latter.

4. A control apparatus as claimed in claim 1 wherein the grooves are eccentric.

5. A control apparatus as claimed in claim 4 wherein the ducts are adjacent shallow parts of the grooves at throttle closed position and adjacent the deepest parts of the grooves at full throttle.

References Cited in the file of this patent

UNITED STATES PATENTS 2,868,155    Phillips    Jan. 13, 1959
2,920,499    Hobbs    Jan. 12, 1960